Nov. 16, 1954  H. E. BECK  2,694,281
REVERSING TRANSMISSION FOR CORN PICKERS
Original Filed Jan. 8, 1949  4 Sheets-Sheet 1

INVENTOR.
Henry E. Beck
BY
Thiess, Olson & Mecklenburger
Attys.

Nov. 16, 1954 H. E. BECK 2,694,281
REVERSING TRANSMISSION FOR CORN PICKERS
Original Filed Jan. 8, 1949 4 Sheets-Sheet 3

INVENTOR.
Henry E. Beck
BY
Thiess, Olson & Mecklenburger
Attys.

Nov. 16, 1954  H. E. BECK  2,694,281
REVERSING TRANSMISSION FOR CORN PICKERS
Original Filed Jan. 8, 1949  4 Sheets-Sheet 4

INVENTOR.
Henry E. Beck.
BY Thiess Olson +
Mecklenburger
Attys.

United States Patent Office 2,694,281
Patented Nov. 16, 1954

2,694,281

REVERSING TRANSMISSION FOR CORN PICKERS

Henry E. Beck, Racine, Wis., assignor to J. I. Case Company, Racine, Wis., a company of Wisconsin Continuation of application Serial No. 69,977, January 8, 1949. This application December 12, 1952, Serial No. 325,656

4 Claims. (Cl. 56—18)

This application is a continuation of my co-pending application Serial No. 69,977, filed January 8, 1949, and now abandoned.

This invention relates to a corn harvester and, more particularly, to a corn picker provided with means for reversing the operation of the snapping rolls and the gathering chains without affecting the operation of the other associated parts of the machine. This invention has particular reference to corn pickers of a general type wherein the machine is provided with a pair of rotating, substantially parallel, snapping rolls for separating ears of corn from the stalks as the machine progresses down a row of corn, gathering chains for transporting the ears rearwardly over the snapping rolls, and an elevator for delivering the ears to a wagon or other vehicle hitched to the picker. Due to the varied conditions and types of corn encountered when harvesting, it is not at all uncommon for crushed stalks, or other foreign materials, to become wedged in between the snapping rolls and seriously interfere with their effective operation. Methods of freezing the rolls, when such difficulty has occurred, have been time consuming, hazardous to the operator, and damaging to the machine itself. Thus it is an object of this invention to provide means for relieving this congested condition between the snapping rolls which may be safely, quickly, and effectively operated in a manner not to interfere with the normal operation of the other associated parts of the picker.

It is a further object of this invention to provide means whereby the operator may effect the desired result from a position removed from the vicinity of the congested rolls.

A particular object of this invention is the provision of a reversing mechanism for the picker rolls of a corn picker which is operable in a manner to permit the relief of a clogging or choking condition between the rolls without exposing the operator to the hazards that may be incident thereto in prior art machines.

It is a still further object of this invention to provide means for preventing the foreign materials ejected from between the rolls to be received and conveyed by the elevator.

Further and additional objects will appear from the following description, the accompanying drawings, and the appended claims.

In carrying out this invention in one form a corn picker is provided having a pair of substantially parallel snapping or picker rolls, between which the ear-bearing stalks pass and by which the ears are snapped from the stalks, a pair of gathering chains associated with said snapping rolls for directing the snapped ears rearwardly, an elevator to the rear of said rolls and chains for receiving and conveying the snapped ears, a second elevator associated with the first-mentioned elevator for further conveying the snapped ears to a desired point, and a blower associated with the first-mentioned elevator for ridding the snapped ears of loose silk and stalk stubs prior to their being received by said second elevator. Cooperating with the power transmitting system for said picker is a reversible transmission which enables the operator of the picker by means of a control lever to cause the rotation of the snapping rolls and the direction of movement of the gathering chains to be reversed without affecting the normal operation of the other associated parts, namely, the elevators and blower. Thus when the snapping rolls become congested with trash, their rotation may be quickly reversed and the trash ejected while the gathering chains, whose operation is also reversed, sweep clear the ejected trash from the rolls. During this operation the elevators to the rear of the rolls and the chains continue to elevate the ears which had previously been received, thereby preventing the ears from becoming intermingled with the ejected trash.

For a more complete understanding of this invention, reference is now made to the drawings wherein—

Figure 1:
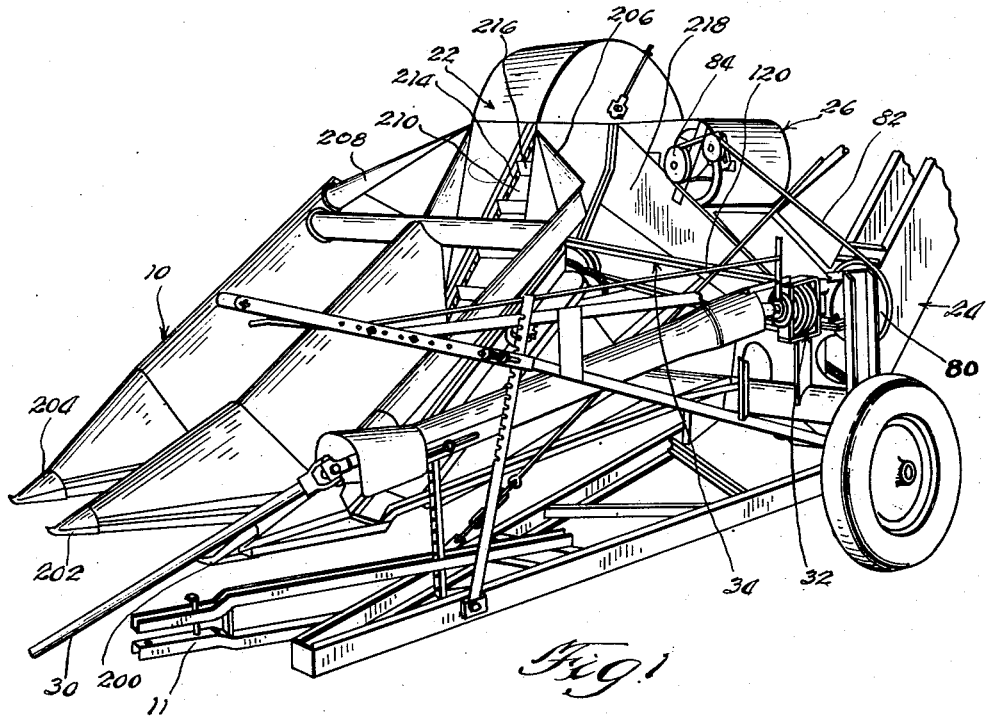
Fig. 1 is a fragmentary perspective view of a corn picker embodying this invention.
Figure 3:
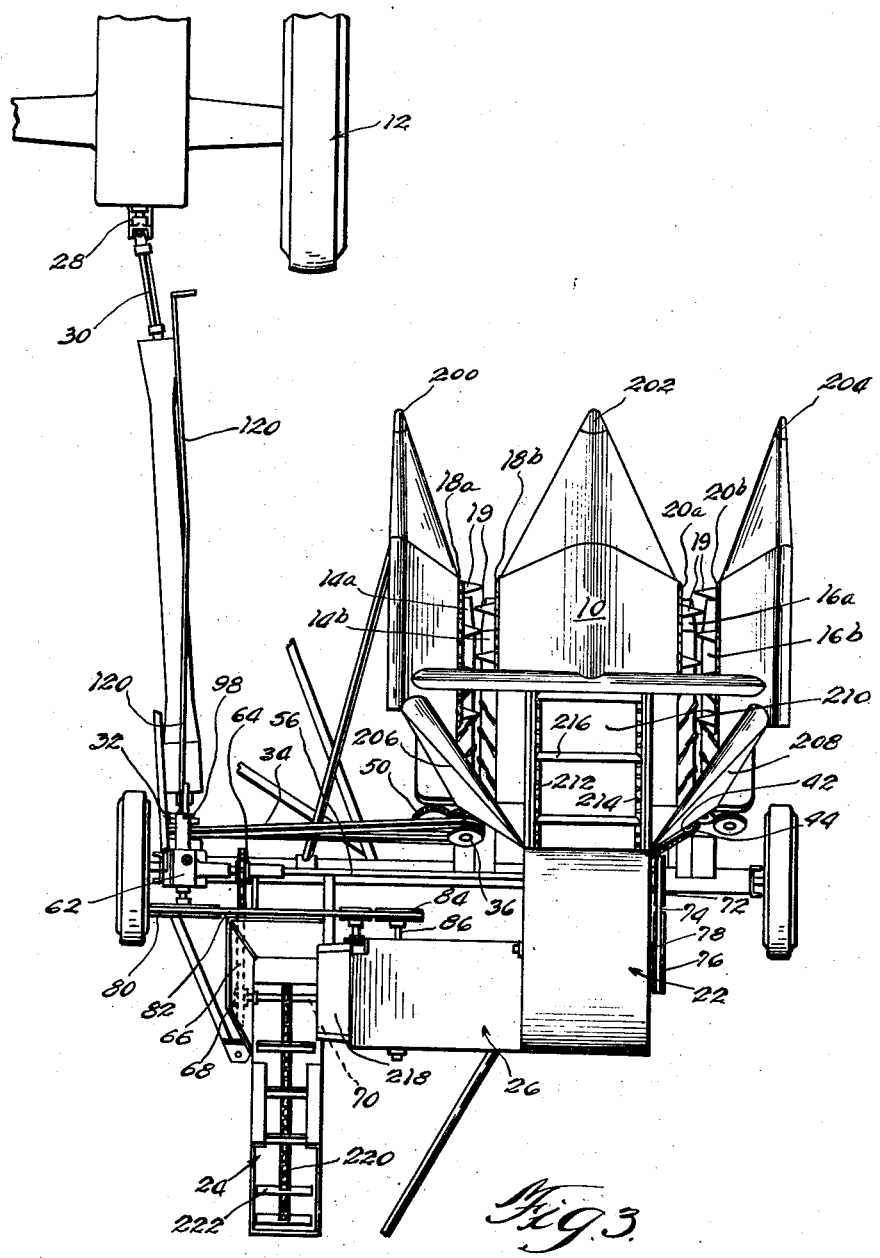
Fig. 3 is a top plan view of the corn picker of Fig. 1 shown connected to the rear end of a tractor for pulling and operating the same.

Referring now to the drawings, a corn picker 10 is provided having the usual frame structure including a forwardly extending hitch member 11 (Fig. 1) by which it is secured to a suitable hitch member (not shown) of a tractor 12 (Fig. 3). The corn picker 10 is designed to pick from two rows of corn at one time and includes three forwardly extending gathering points 200, 202 and 204 which are arranged to gather the stalks in each of two rows of corn and direct them between two pairs of forwardly extending picker rolls 14a, 14b, and 16a, 16b. The picker rolls of each pair normally rotate downwardly toward each other and snap ears of corn from the stalks, and the resulting ears are moved rearwardly over the picker rolls by means of two pairs of gathering chains 18a, 18b and 20a, 20b provided with extensions 19. The portions of each pair of gathering chains adjacent each other thus are normally driven in a rearward direction. The ears of corn from each pair of picker rolls are diverted by deflectors 206 and 208 to an elevator 22 comprising a stationary floor portion 210, a pair of power-driven endless chains 212 and 214, and lift plates 216, the latter being secured at their opposite ends to said chains and serving to lift the ears to the top of the elevator 22. The ears passed to the top of the elevator 22 are delivered to a partially enclosed chute 218 extending transversely of the rear portion of the corn picker. The ears fall by gravity down the chute to the lower portion of a second elevator 24 constituting means for loading a wagon or other vehicle (not shown) drawn behind the corn picker. The elevator 24 is similar to elevator 22 and includes a power-driven endless chain 220 to which is secured a plurality of lift plates 222 in a conventional manner.

A blower 26 operated through belt 82 is mounted above the chute 218 and serves to direct a blast of air over the ears discharged from the elevator 22 to the chute 218 whereby loose silk, leaves and other material are blown free of the ears transversely through an opening 223.

As indicated above the corn picker comprises the following power-driven units: the two pairs of snapping rolls 14a, 14b and 16a, 16b through which the ear-bearing stalks pass and by which the ears are snapped from said stalks, the two pairs of gathering chains 18a, 18b and 20a, 20b, the elevator 22, the second elevator 24, and the blower 26. The power transmission systems for driving the various above-mentioned units vary somewhat and therefore will be described separately. A power take-off 28 of tractor 12 and a forwardly extending drive shaft 30 connected to said power take-off are common to the power transmitting systems for all the above-mentioned units.

In normal operation of the corn picker, the adjacent portions of adjacent snapping rolls 14a and 14b and snapping rolls 16a and 16b are driven to rotate inwardly and downwardly toward each other so as to hold the ear-bearing stalks erect while passing between the rolls and to cause the ears to be snapped from the stalks. Likewise the adjacent portions of endless chains 18a, 18b and 20a, 20b are normally driven rearwardly so as to aid the stalks in their rearward movement between the rolls and to direct the snapped ears over the rolls to the elevator 22.

Figure 2:
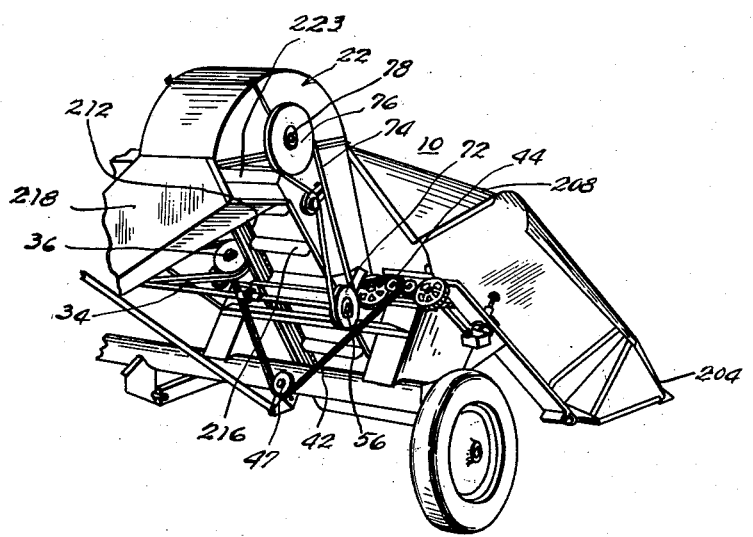
Fig. 2 is a fragmentary perspective rear view of the corn picker shown in Fig. 1 illustrating the elevator located adjacent the rear of the snapping or picker rolls.
Figure 4:
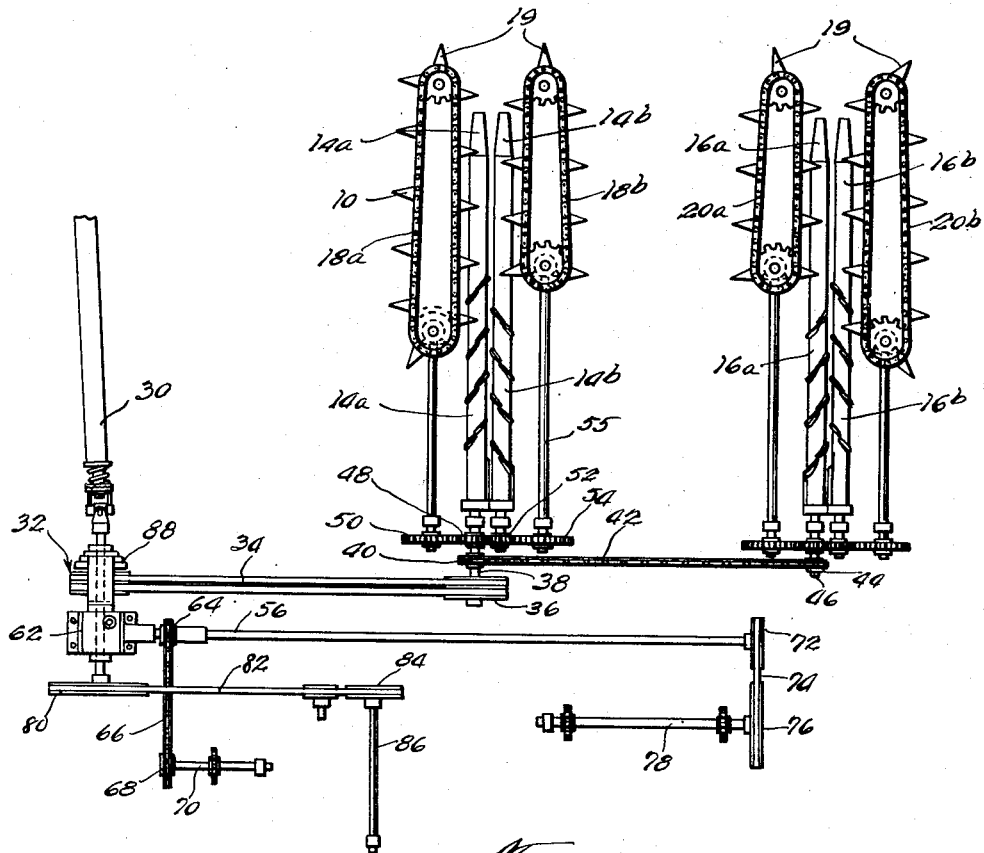
Fig. 4 is a diagrammatic view of the power transmitting mechanism utilized in the picker.

The power system for driving the snapping rolls 14a, 14b and 16a, and 16b and gathering chains 18a, 18b and 20a, 20b is the same and comprises a reversible transmission 32 associated with the drive shaft 30, and a double belt drive 34 from the transmission to roll 14a. The transmission 32 will be described more fully later. The double belt 34 leading from said transmission 32 engages pulley wheel 36, which is keyed to shaft 38 of roll 14a as shown in Fig. 4. Forward of said pulley wheel 36 and keyed to shaft 38 is a sprocket 40 which cooperates with an endless chain 42 for transmitting driving power to sprocket 44 which is keyed to shaft 46 of the inward snapping roll 16a. The chain drive from roll 14a to roll 16a is shown in Fig. 4, and in Fig. 2 it will be noted that the chain 42 passes over an adjustable idling sprocket 47 secured to a lower portion of the frame of the corn picker. A spur gear 48, which is keyed to shaft 38, forwardly of sprocket 40, meshes with spur gears 50 and 52 keyed to the drive shafts for gathering chain 18a and snapping roll 14b, respectively. A spur gear 54 keyed to the shaft 55 of gathering chain 18b also meshes with gear 52. A like gear driving system is provided for the other pairs of snapping rolls 16a and 16b and gathering chains 20a and 20b. It will thus be apparent that, when the double belt drive 34 operates in one direction, adjacent snapping rolls will rotate downwardly toward each other and the gathering chains will convey snapped ears in a rearward direction, but that when the double belt drive operates in the opposite direction, the direction of movement of the gathering chains and of the rotation of the snapping rolls will be reversed.

Figure 5:
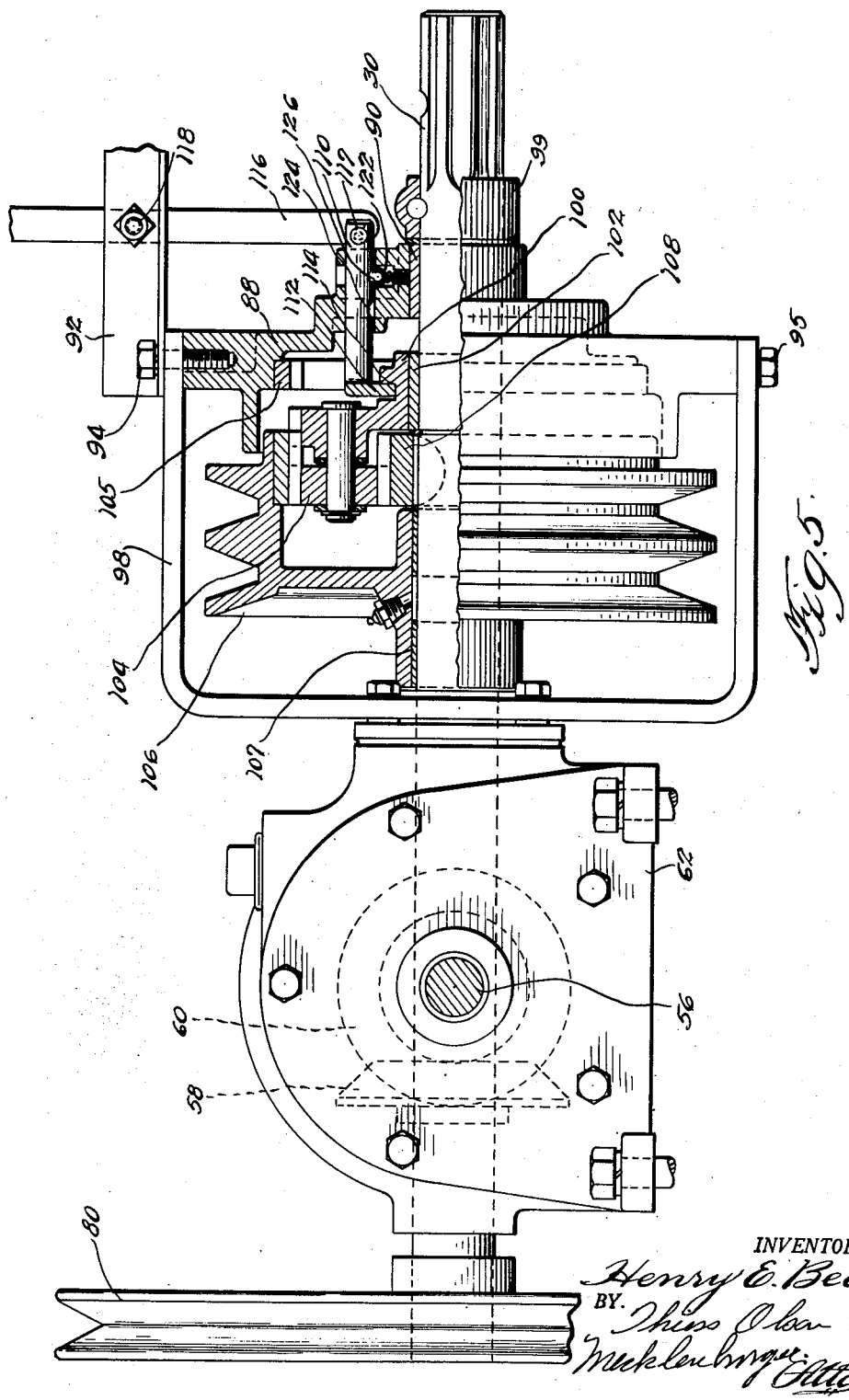
Fig. 5 is an enlarged side elevational view of the reversible transmission shown in Fig. 4 and with a portion thereof shown in section.

The power transmitting system for the elevators 22 and 24 is as follows: the power from shaft 30 is transmitted to a transverse drive shaft 56 through a pair of meshing beveled gears 58 and 60, keyed to shafts 30 and 56, respectively. Said gears 58 and 60 are enclosed within a housing 62 which is located immediately to the rear of transmission 32 as shown in Fig. 5. A sprocket 64, keyed to drive shaft 56, cooperates with a chain 66 for driving sprocket 68 keyed to drive shaft 70 of elevator 24. To the outwardly protruding end of shaft 56 is keyed pulley wheel 72 which cooperates with belt 74 which in turn cooperates with pulley wheel 76, keyed to drive shaft 78 of elevator 22. Thus it will be seen that the direction of rotation of shaft 30, which is always the same, is directly transmitted to shaft 56 and then to elevators 22 and 24 so that the elevators always continue their normal directions of rotation and are not stopped or reversed when the reversible transmission for the picker rolls and gathering chains is reversed, as will be hereinafter more fully described.

The power transmitting system for blower 26 comprises a pulley wheel 80 keyed to the rear end of drive shaft 30, a pulley wheel 84, keyed to drive shaft 86 of blower 26 and a pulley belt 82 cooperating with said wheels 80 and 84, as shown in Figs. 3 and 4. Thus the direction of rotation of the operating mechanism for the blower is likewise always in one direction independent of the reversible transmission.

Figure 6:
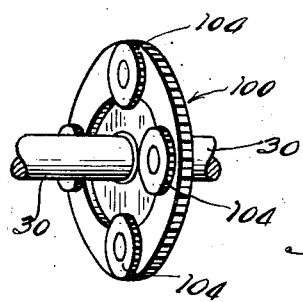
Fig. 6 is a fragmentary perspective view of the gear carrier which is a part of the reversible transmission assembly showing the arrangement of the pinion gears about its face.

The reversible transmission 32, as above mentioned, is operatively positioned between the main drive shaft 30 and the power driving system for the picker rolls 14a, 14b and 16a, 16b and the gathering chains 18a, 18b and 20a, 20b and enables the operator of the corn picker to cause a reversal of rotation of the picker rolls and gathering chains without affecting the normal operation of the various other associated power-driven units above described. Referring particularly to Fig. 5, a dog anchorage device 88 is rigidly supported between the opposing arms of a U-shaped strap 98 by means of bolts 94 and 95 threaded into said dog anchorage device 88. The resulting assembly is rigidly bolted to a frame member 92 of the corn picker also by bolt 94. A bearing sleeve 90 is positioned in a central aperture of the device 88 and is adopted to receive and support the main drive shaft 30 in rotatable relationship. A thrust bearing 99 keyed to shaft 30 immediately forward of said anchorage device 88 prevents any forward movement of said device with respect to the shaft. A gear carrier 100, rotatably mounted on shaft 30 by means of a bearing sleeve 102 and having a plurality of pinion gears 104 rotatably mounted about its face, as shown in Fig. 6, is adapted to be moved in an axial direction so that when it is in the forward position, it meshes with a ring gear 105 of said anchorage device 88 and thereby is prevented from rotating. An internally geared pulley wheel or two-way rotatable rotor 106, rotatably mounted on shaft 30 by means of bearing sleeve 107, transmits the power from shaft 30 to double belts 34 which in turn drive the snapping rolls 14a, 14b and 16a, 16b and the gathering chains 18a, 18b and 20a, 20b. The gear of said pulley wheel 106 is adapted to mesh with pinion gears 104 when gear carrier 100 is in a forward position and meshes with both the pinion gears 104 and gear carrier 100 when said carrier is in the rearward position as shown in Fig. 5. A sun gear 108, keyed to shaft 30, meshes with pinion gears 104 so that when the gear carrier 100 is in its forward position and meshing with the ring gear 105 of the dog anchorage device 88 and the gear 106 is still meshing with the pinion gears 104, the rotation of shaft 30 is transmitted to pinion gears 104 and then to the internally geared pulley 106 thereby causing the rotation of the pulley wheel 106 to be in a direction opposite to that of shaft 30. When gear carrier 104 is in its rearward position as shown in Fig. 5, sun gear 108 continues to mesh with pinion gears 104 and the pinion gears 104 mesh with internally geared pulley wheel 106. However, in this rearward position, gear carrier 100 meshes with the gear in said pulley wheel as well, and thereby causes sun gear 108, gear carrier 100, and pinion gears 104 to act as a single unit thereby causing shaft 30 and pulley wheel 106 to rotate in the same direction. Thus when gear carrier 100 is in its rearward position as shown in Fig. 5 the picker rolls 14a, 14b and 16a, 16b and gathering chains 18a, 18b and 20a, 20b are operating normally.

The gear carrier 100 is movable in an axial direction from a rearward position to a forward position and vice versa by means of a pin 110 which is provided with a downwardly extending tongue 112, as shown in Fig. 5, which engages a peripheral groove 114 cut in the gear carrier 100. To the forward end of said pin 110 is attached a vertically extending arm 116, at point 117. Said arm 116 is pivotally mounted on the frame 92 at point 118 and to its upwardly extending end is attached a forwardly extending control rod 120 (see Fig. 3) which terminates adjacent the operator's seat (not shown) of tractor 12. A spring ball member 122 is caused to engage with dimples 124 and 126 formed in the underside of pin 110 and tends to retain said pin and the reversing mechanism in either its forward or rearward position during operation. However, operation of the control rod 120 and the pin 110 by the operator will compress the spring ball member 122 into its socket and permit movement of the reversing mechanism from one position to another when desired.

As clearly indicated in the drawings, the drive shaft 30 extends through and beyond the reversible transmission 32 through housing 62 which encloses beveled gears 58 and 60 for driving elevators 22 and 24. Drive shaft 30 also extends beyond housing 62 and to its rear end is keyed pulley wheel 80, said pulley wheel serving to transmit power for the blower 26, all as previously described.

Thus it will be seen from the above description that means is provided whereby the snapping rolls and the gathering chains may be reversed in operation when the rolls become clogged with foreign materials without affecting the normal operation of the various other associated parts. The mechanism for effecting this desired result is simple and is controlled at a point readily accessible to the operator. An effective means has been provided which eliminates the dangers inherent in attempting to relieve by hand a clogging condition between the snapping or picker rolls while they are rotating in their normal direction.

While a particular embodiment of this invention is shown above, it will be understood, of course, that the invention is not to be limited thereto, since many modifications may be made and it is contemplated, therefore, by the appended claims, to cover such modifications as fall within the true spirit and scope of this invention.

Having thus described the invention, what is claimed and desired to be secured by Letters Patent is:

1. In a corn harvester, a mobile frame having a pair of longitudinally extending snapping rolls mounted thereon, a longitudinally extending power shaft on said frame and driven in one direction only from a suitable source of power, transmission from said power shaft to said snapping rolls comprising a two-way rotatable rotor, and transmission means connecting said rotor to said rolls, said rotor being substantially coaxial with said power shaft, and reversing means connected to said rotor for reversing the rotation of said rotor, and manually operable means for controlling the direction of rotation of said two-way rotatable rotor which, in one position, enables snapping rotation of the snapping rolls and, in another position, enables a reverse disgorging rotation of the snapping roll.

2. In a corn harvester, a mobile frame having a pair of longitudinally extending snapping rolls mounted thereon, a power shaft on said frame and driven in one direction only from a suitable source of power, transmission from said power shaft to said snapping rolls comprising a two-way rotatable rotor, and transmission means connecting said rotor to said rolls, said rotor being substantially coaxial with said power shaft, and reversing means connected to said rotor for reversing the rotation of said rotor, and manually operable means for controlling the direction of rotation of said two-way rotatable rotor which, in one position, enables snapping rotation of the snapping rolls and, in another position, enables a reverse disgorging rotation of the snapping roll.

3. In a corn harvester, a mobile frame having a pair of longitudinally extending snapping rolls mounted thereon, a power shaft on said frame and driven in one direction only from a suitable source of power, transmission from said power shaft to said snapping rolls comprising a two-way rotatable rotor, and transmission means connecting said rotor to said rolls, said rotor being substantially coaxial with said power shaft, and reversing means connected to said rotor for reversing the rotation of said rotor, manually operable means for controlling the direction of rotation of said two-way rotatable rotor which, in one position, enables snapping rotation of the snapping rolls and, in another position enables a reverse disgorging rotation of the snapping roll, a unidirectional conveyor which receives ears delivered from said snapping rolls, and unidirectional transmission from said unidirectional driven shaft to said unidirectional conveyor.

4. In a corn harvester, a mobile frame having a pair of longitudinally extending snapping rolls mounted thereon, gathering chains mounted on said frame extending alongside said snapping rolls for controlling the movement of the snapped ears on said rolls, a power shaft on said frame and driven in one direction only from a suitable source of power, transmission from said power shaft to said snapping rolls and gathering chains comprising a two-way rotatable rotor, and transmission means connecting said rotor to said rolls and gathering chains, said rotor being substantially coaxial with said power shaft, and reversing means connected to said rotor for reversing the rotation of said rotor, and manually operable means for controlling the direction of rotation of said two-way rotatable rotor which, in one position, enables snapping rotation of the snapping rolls and rearward movement of said gathering chains and, in another position, enables a reverse disgorging rotation of the snapping roll and forward movement of said gathering chains.

References Cited in the file of this patent

UNITED STATES PATENTS

| Number | Name | Date |
|---|---|---|
| 1,885,156 | Thomas et al. | Nov. 1, 1932 |
| 2,390,585 | Gohlke | Dec. 11, 1945 |
| 2,493,592 | Peabody | Jan. 3, 1950 |
| 2,525,481 | Flora | Oct. 10, 1950 |
| 2,527,802 | Dwyer | Oct. 31, 1950 |
| 2,636,330 | Krause | Apr. 28, 1953 |